(12) United States Patent
Dati et al.

(10) Patent No.: US 7,430,704 B2
(45) Date of Patent: Sep. 30, 2008

(54) TRELLIS-BASED DETECTION PROCESS AND SYSTEM

(75) Inventors: Angelo Dati, Viareggio (IT); Pierandrea Savo, Pavia (IT); Ezio Iacazio, Vercelli (IT); Kelly Fitzpatrick, Sudbury, MA (US); Peter McEwen, deceased, late of Santa Clara CA (US); by John J. McEwen, legal representative, The Woodlands, TX (US); Bahjat Zafer, Sunnyvale, CA (US)

(73) Assignees: STMicroelectronics S.r.l. (IT); Maxtor Corporation, Longmont, CO (US)

( * ) Notice: Subject to any disclaimer, the term of this patent is extended or adjusted under 35 U.S.C. 154(b) by 451 days.

(21) Appl. No.: 11/025,769

(22) Filed: Dec. 20, 2004

(65) Prior Publication Data

US 2005/0246614 A1    Nov. 3, 2005

Related U.S. Application Data

(60) Provisional application No. 60/530,949, filed on Dec. 19, 2003.

(51) Int. Cl.
*H03M 13/03* (2006.01)
(52) U.S. Cl. .................................................. 714/794
(58) Field of Classification Search .................. 714/792
See application file for complete search history.

(56) References Cited

U.S. PATENT DOCUMENTS

| | | | | | |
|---|---|---|---|---|---|
| 5,027,374 | A | * | 6/1991 | Rossman | 375/341 |
| 5,257,272 | A | * | 10/1993 | Fredrickson | 714/792 |
| 5,544,178 | A | * | 8/1996 | Zook | 714/786 |
| 6,334,201 | B1 | * | 12/2001 | Sawaguchi et al. | 714/795 |
| 6,492,918 | B1 | | 12/2002 | Rezzi et al. | |
| 6,604,204 | B1 | | 8/2003 | Ozdemir et al. | |
| 6,662,338 | B1 | | 12/2003 | Rezzi et al. | |

* cited by examiner

*Primary Examiner*—Shelly A Chase
(74) *Attorney, Agent, or Firm*—Lisa K. Jorgenson; Bryan A. Santarelli (57) ABSTRACT

A method for detecting signals affected by intersymbol interference provides for a path memory in the form of a trellis admitting survivor paths comprising a first and a second stage. The first stage includes a shift register exchange with a given number of states and a given length $\lambda$. The first stage outputs a first state $S^{Ak}_{k-\lambda}$ on the survivor path for the best state $A_k$, and a second state $S^{Bk}_{k-\lambda}$ on the survivor path for another state $B_k$. The second stage is configured as a two-state shift register exchange having a respective memory length $\Lambda$, including respective first and second registers. In the respective first and second registers the survivor paths are stored leading to a respective first $\sigma^0_k$ and second $\sigma^1_k$ state, whereby the respective first register contains the backend of the best survivor path, while the respective second register contains the backend of an alternative survivor path.

34 Claims, 10 Drawing Sheets

TRELLIS-BASED DETECTION PROCESS AND SYSTEM

CLAIM OF PRIORITY

This application claims priority to U.S. Provisional Application Ser. No. 60/530,949, filed on Dec. 19, 2003, which is incorporated by reference.

FIELD OF THE INVENTION

The present invention relates generally to trellis-based detection techniques as exemplified by the solution known as the Viterbi Algorithm (VA).

BACKGROUND

In typical trellis-based detection arrangements, when a 16-state intersymbol interference (ISI) channel is combined with a single bit parity code, the number of states in the combined trellis is 32. The minimum-distance error-events in the combined trellis consist of either a single even parity error-event (i.e., +−, +−+−, +0+, . . . ) or two odd-parity error events (i.e., +, +−+, +0+0+, . . . ). Since the two odd parity error-events do not have to be close to each other, the path memory for the 32-state trellis must be longer than the parity-code block length, which is typically very large.

For example, if the parity-code block length for a channel is 82 bits, a path-memory length of L=97 is currently required. A standard 32-state shift register exchange algorithm contains 32·(L−1) flip-flops. If, e.g. the number of flip-flops is 3072, this means that the path memory alone is more than 17 times larger than the path memory for typical read channel with 16-states and L=12.

An example of a parity-sensitive Viterbi detector is disclosed and discussed in detail in U.S. Pat. No. 6,662,338, which is incorporated by reference.

In view of the foregoing, the need exists for trellis detector arrangements of reduced complexity wherein reduction in complexity does not adversely affect the performance level.

SUMMARY

According to an embodiment of the present invention, a two-stage path memory arrangement is used in order to reduce complexity. The first stage is a 32-state shift register exchange with a short path memory length λ=28 and the second stage is a 2-state shift register exchange with a longer path memory length of Λ=L−λ=69. In direct comparison with the example made above, the number of flip-flops is reduced to 32·λ+2·(Λ−1)=1032, which is only five times larger than the path memory of a typical non-parity-sensitive Viterbi detector with 16 states and L=12.

BRIEF DESCRIPTION OF THE DRAWINGS

The invention will now be described, by way of example only, with reference to the annexed drawings.

DETAILED DESCRIPTION

By way of premise, a brief overview is provided of a standard 32-state path memory, with path memory length L, for single-bit parity.

The path memory stores the survivor path leading to each of the 32 states at time k.

Let $S_k = [P_k, x_{k-3}, x_{k-2}, x_{k-1}, x_k]$ denote one of the states at time k, where $P_k$ denotes even or odd parity. A decimal value for the state is obtained from the binary representation, $S_k = 16 \cdot P_k + 8 \cdot x_{k-3} + 4 \cdot x_{k-2} + 2 \cdot x_{k-1} + x_k$.

There are two paths leading to this state coming from states $[P_{k-1}, 0, x_{k-3}, x_{k-2}, x_{k-1}]$ and $[P_{k-1}, 1, x_{k-3}, x_{k-2}, x_{k-1}]$ at time k-1, with $P_{k-1} = P_k \oplus x_k$. The path with the minimum metric is selected by sending the selected binary value for $x_{k-4}$ to the input of the path memory.

The new survivor path for state $[P_k, x_{k-3}, x_{k-2}, x_{k-1}, x_k]$ is obtained by shifting the old survivor path for state $[P_{k-1}, x_{k-4}, x_{k-3}, x_{k-2}, x_{k-1}]$ to the right by one and shifting in $x_{k-4}$. The output of the 32-state shift register exchange unit is $\{x^0_{k-L-3}, x^1_{k-L-3}, x^2_{k-L-3}, \ldots, x^{31}_{k-L-3}\}$, where the superscript indicates the state at time k. The final decision at the output of the sequence detector is selected from the survivor path leading to the best state at time k, which is obtained by comparing all 32 state metrics at time k. The output of the sequence detector is $x^{Ak}_{k-L-3}$, where $A_k$ denotes the best state at time k.

Figure 1:
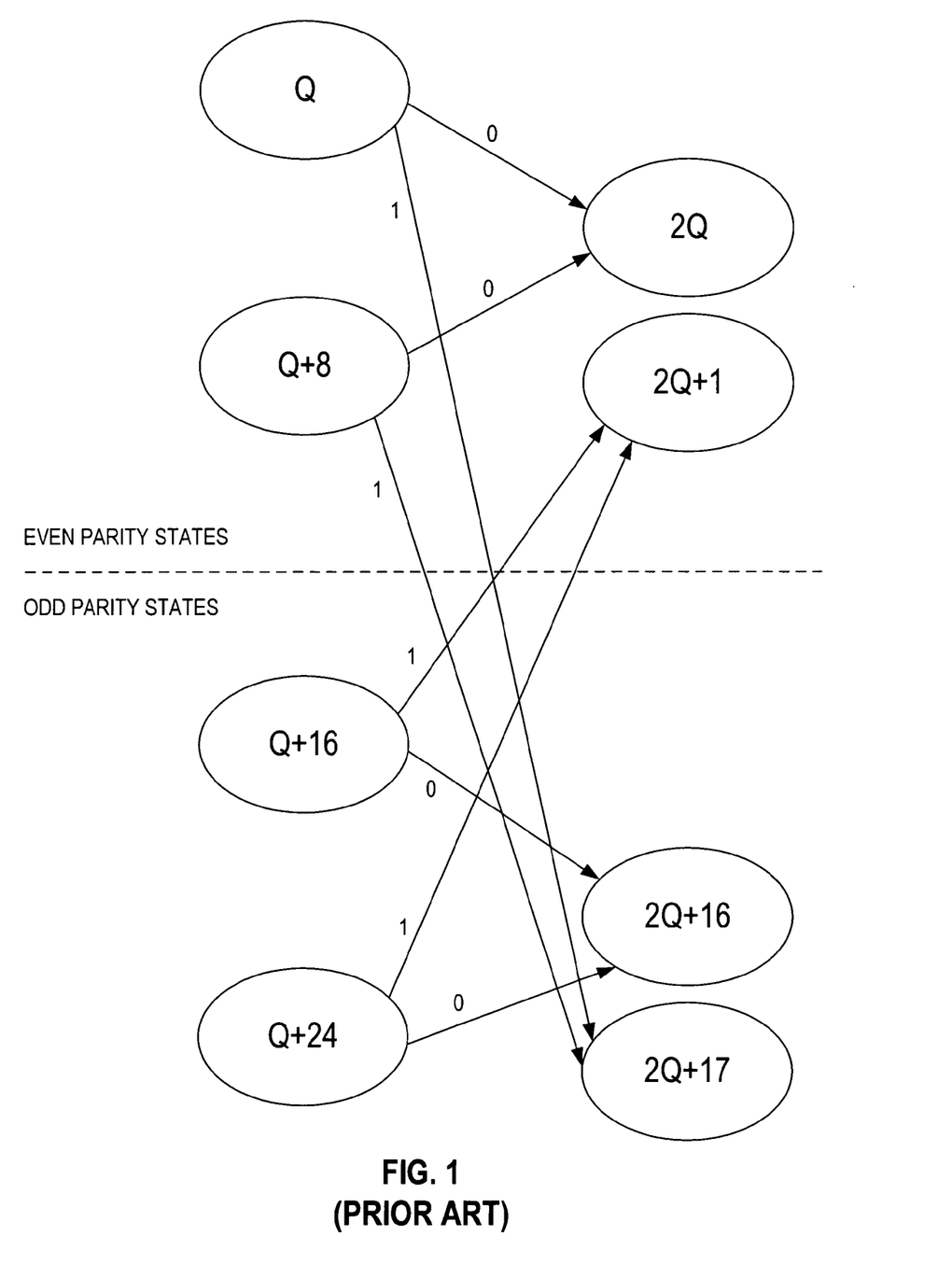
FIG. 1 shows two types of subtrellises in a 32-state trellis, for $Q \in \{0, 1, 2 \ldots 7\}$.
Figure 2:
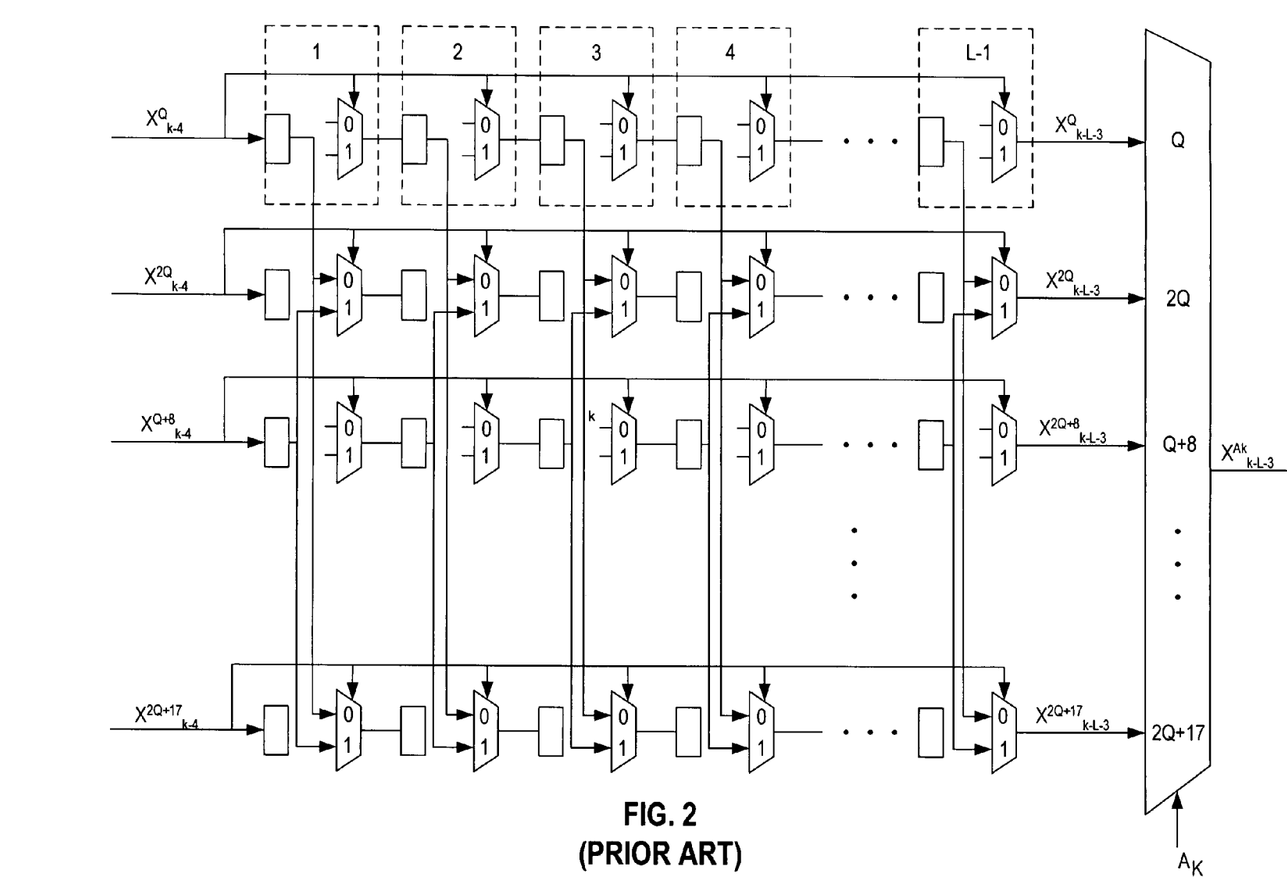
FIG. 2 is a functional block diagram of a shift register exchange unit showing the details for the subtrellis in FIG. 1.

For one of the two subtrellises shown in FIG. 1, the basic structure of the path memory exchange unit is shown in FIG. 2.

Figure 3:
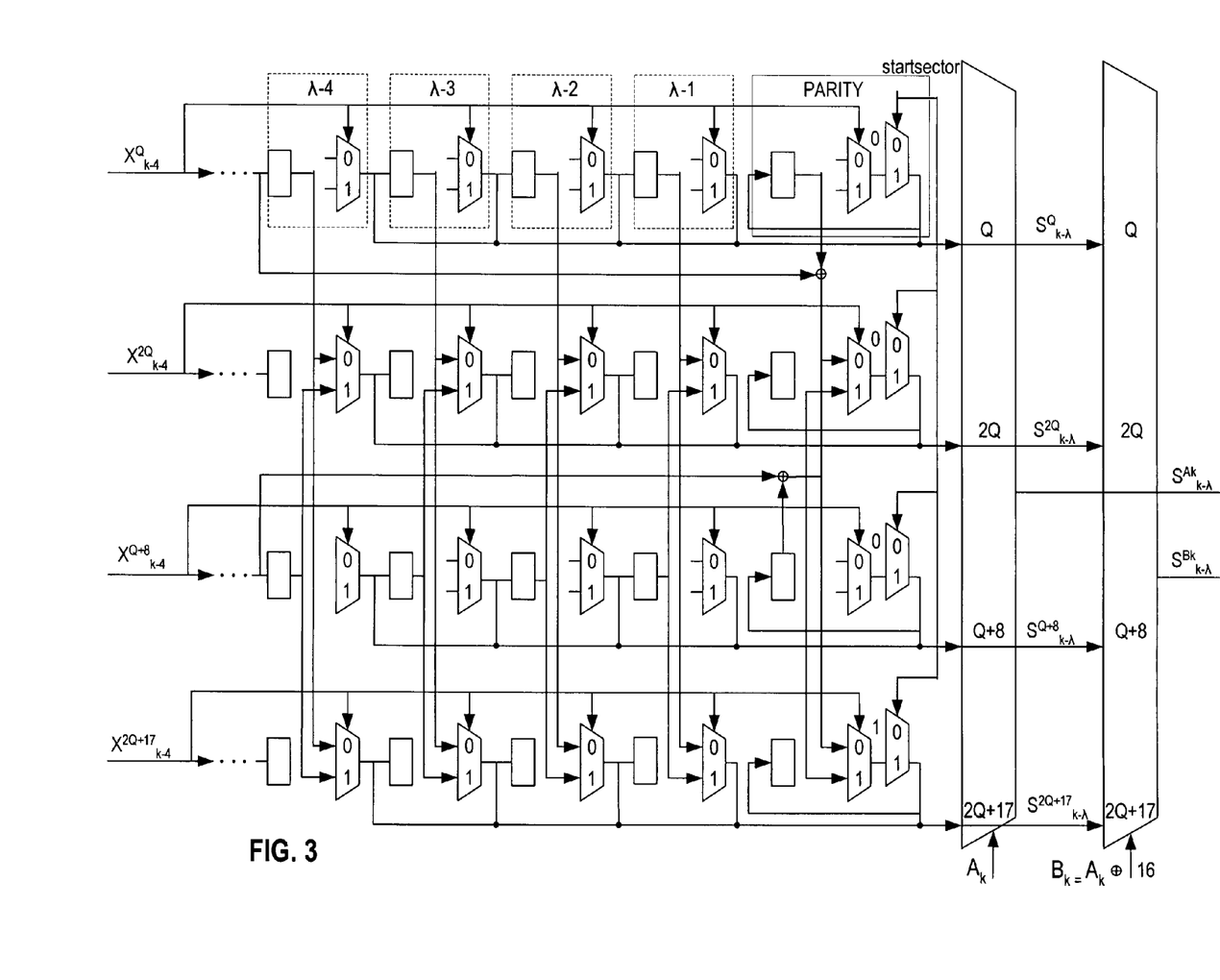
FIG. 3 is a functional block diagram of the first stage of a reduced complexity arrangement according to an embodiment of the invention.
Figure 4:
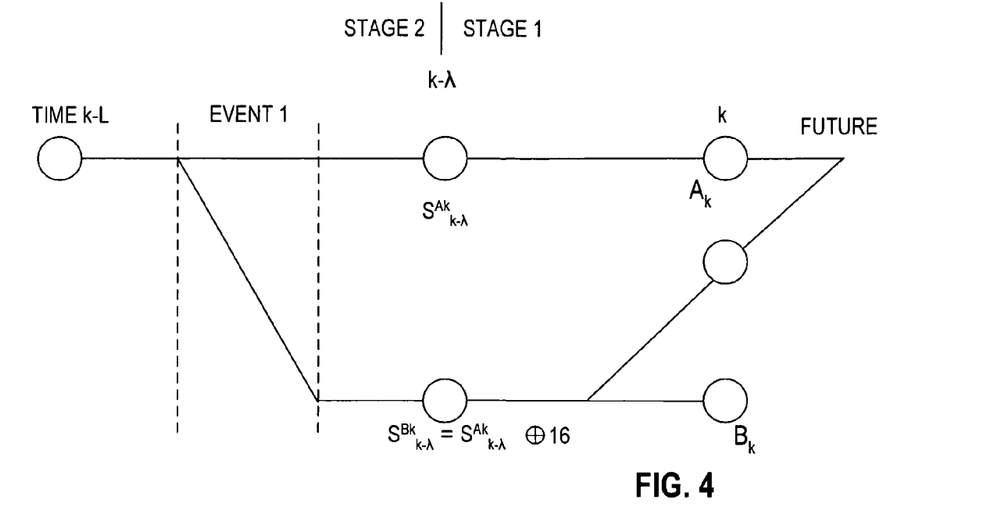
FIG. 4 is an example of the survivor paths for the case $S^{Bk}_{k-\lambda} = S^{Ak}_{k-\lambda} \oplus 16$, where event 1 shown therein is an odd parity error-event that is at least partially contained in stage 2 of the path memory according to an embodiment of the invention.

In the block diagram of FIG. 2 (and the block diagrams of FIGS. 3 and 8 as well) the symbols x, with various superscripts, designate the input binary values at a given instant of time—identified by a suffix (e.g. x-4 in FIGS. 2 and 4). The units shown as comprised of a rectangular block with a cascaded trapezoidal block schematically represent the flip-flops with associated logic circuitry comprising the trellis detector. The large output trapezoidal blocks designate the blocks that generate the output signal as a result of selecting the path with minimum metric.

The kind of formal representation adopted in the captioned figures is well known to those of skill in the art, thus making it unnecessary to provide a more detailed description herein.

Also, it will be appreciated that such logical representations lend themselves to being implemented both in the form of dedicated processors and by resorting to general-purpose processors such as a DSP programmed by means of a suitable computer software product.

Since each block in FIG. 2 has even parity, only states with even parity are allowed at the end of the block, when k is a multiple of the block length. Therefore, the 32-state trellis is pruned to remove the branches and states that are not allowed.

In the reduced complexity algorithm according to an embodiment of the invention, the first stage involves a standard 32-state shift register exchange with length $\lambda$. However, the first stage is modified to output the state at time k-$\lambda$ on the survivor path for the best state at time k, $S^{Ak}_{k-\lambda}$. This requires keeping track of the parity for the state at time k-$\lambda$ on each of the 32 survivor paths.

This is done using a shift-register exchange method that initializes the parity values near the beginning of the sector. The parity bit at the end of register S should be initialized to the parity state of S.

Since the survivor paths are initialized to all zeros at the beginning of the sector at an arbitrary time k=$t_0$ relative to the data, the parity of the state at time k-$\lambda$ at the end of the survivor path leading to state j at time k should be initialized to the modulo 2 sum of the 5 bits in the state number $$\text{parityvec}[j]=((j>>4)\&1)\wedge((j>>3)\&1)\wedge((j>>2)\&1)\wedge((j>>1)\&1)\wedge(j\&1).$$

If time 0 corresponds to the first data bit, then due to the trellis pruning all the states in the survivor paths at time −1 must have parity 0. Therefore, at time k=$\lambda$-1, parityvec[j] should be zero for all values of j.

Since there is not infinite memory, a correct initialization is important to ensure that the parity in parityvec is the exact value that it is supposed to be.

It will be appreciated that this solution is somewhat resilient to incorrect initialization. However, under an incorrect-initialization criterion, this solution may not work properly when there is an error-event straddling the end of the address mark and the beginning of the data.

When testing the initialization, the relationship between the initialization time $t_0$ and the data should be varied.

In current operation according to an embodiment of the invention, the first stage outputs the state at time k-$\lambda$ on the survivor path for state $B_k=A_k\oplus 16$ at time k, $S^{Bk}_{k-\lambda}$. State $B_k$ has the same ISI state as the best state and the opposite parity state.

A diagram of the first stage of the reduced complexity path memory is shown in FIG. 3 according to an embodiment of the invention. The dots in the diagram indicate connections to a bus.

Given the two states at the output of the first stage, $S^{Ak}_{k-\lambda}$ and $S^{Bk}_{k-\lambda}$, there are three cases for consideration according to an embodiment of the invention: $S^{Bk}_{k-\lambda}=S^{Ak}_{k-\lambda}\oplus 16$, $S^{Bk}_{k-\lambda}=S^{Ak}_{k-\lambda}$, and none of the above.

In the first case, the survivor paths for states $A_k$ and $B_k=A_k\oplus 16$ are parallel paths with opposite parity states and exactly the same ISI states from time k-$\lambda$ to time k. As shown in FIG. 4, there is an odd parity error-event in stage 2 of the path memory (event 1).

Figure 5:
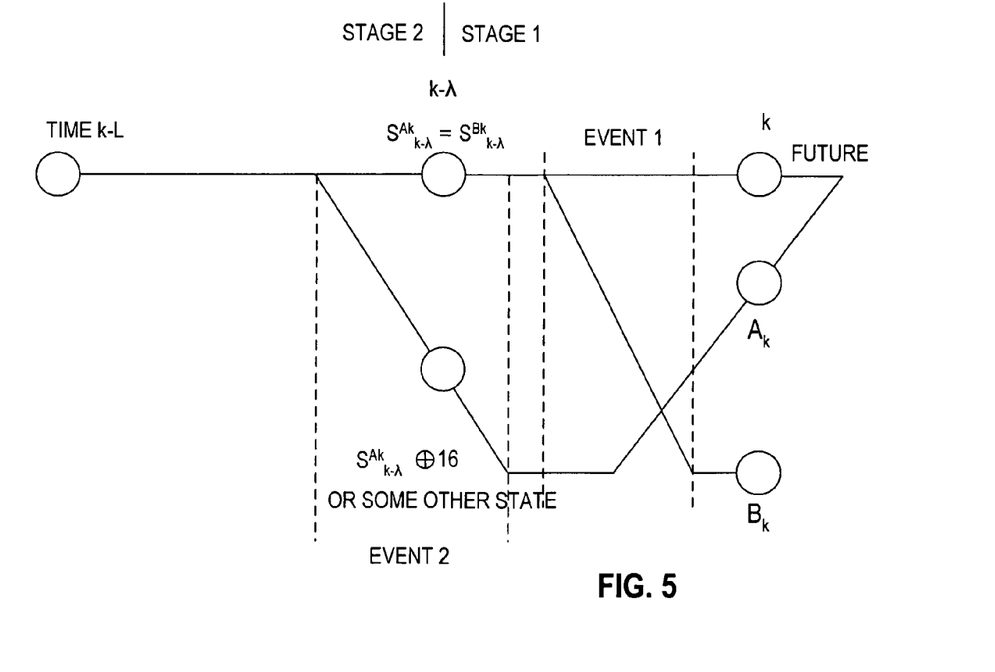
FIG. 5 is an example of the survivor paths for the case $S^{Bk}_{k-\lambda} = S^{Ak}_{k-\lambda}$, where event 1 shown therein is an odd parity error-event that is at least partially contained in stage 2 of the path memory according to an embodiment of the invention.

In the second case, shown in FIG. 5, an odd-parity error event in stage 1 of the path memory (event 1) has a smaller Euclidean distance than the odd-parity error event starting in stage 2 (event 2). The error-event in stage 2 is extended since it can reemerge as the dominant error-event in the future.

Figure 6:
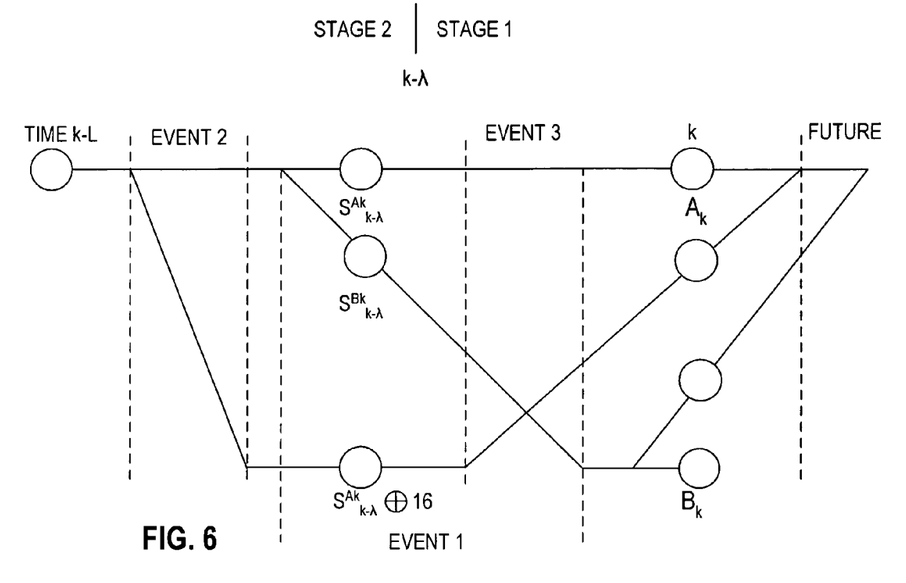
FIG. 6 is an example of the survivor paths for the case $S^{Bk}_{k-\lambda}$ is not equal to $S^{Ak}_{k-\lambda}$ or $S^{Ak}_{k-\lambda} \oplus 16$, when $\lambda < 2L_{max} - 2$; event 1 replaces event 2 in stage 2 of the path memory according to an embodiment of the invention.

In the third case, a new error-event in stage 2 of the path memory (event 1) becomes dominant and replaces the old error-event (event 2), as shown in FIG. 6.

Since event 1 has not reached its full distance, this can cause diminished performance unless the path-memory length of stage 1 is long enough too avoid an error-event starting in stage 2 (event 1) from overlapping with an error-event ending in the future (event 3).

Figure 7:
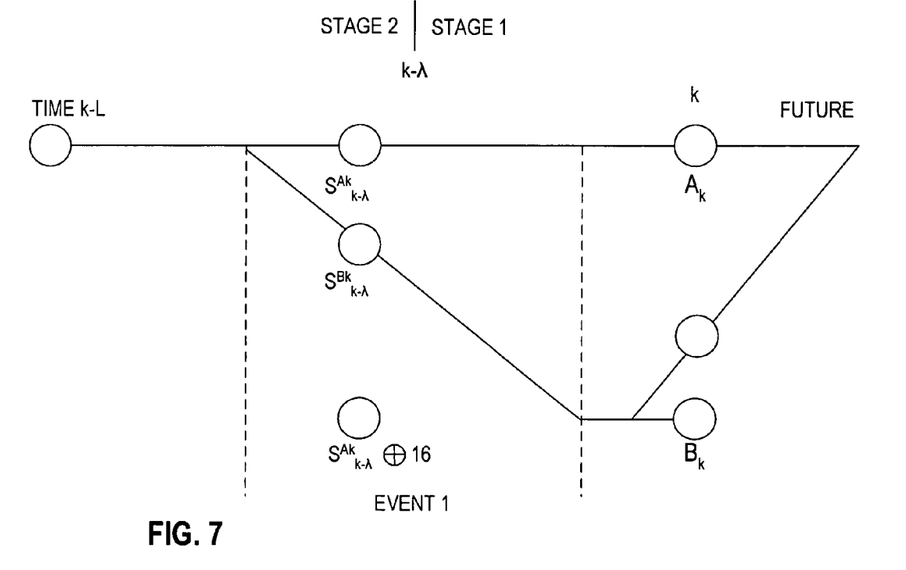
FIG. 7 is an example of the survivor paths for the case $S^{Bk}_{k-\lambda}$ is not equal to $S^{Ak}_{k-\lambda}$ or $S^{Ak}_{k-\lambda} \oplus 16$, when $\lambda \geq 2L_{max} - 2$ according to an embodiment of the invention.

The performance issue is eliminated when $\lambda \leq 2L_{max}-2$, where $L_{max}$ is the maximum length of an odd parity error-event, since overlapping events are resolved in stage 1 before entering stage 2. The remaining survivor paths are shown in FIG. 7.

Figure 8:
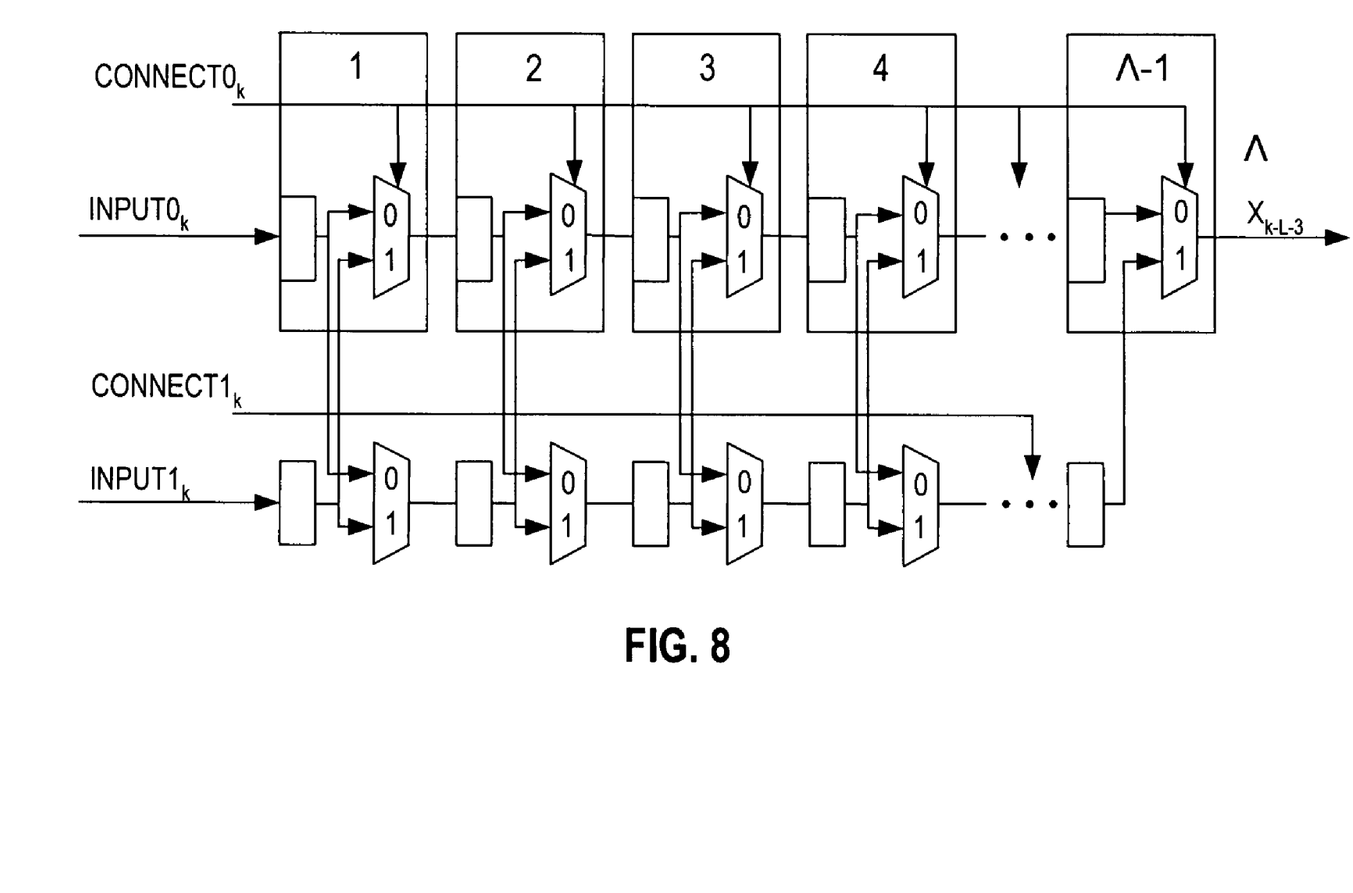
FIG. 8 shows the 2-state shift register exchange associated with the second stage of the reduced complexity arrangement according to an embodiment of the invention.

The second stage of the reduced complexity algorithm consists of a 2-state shift-register exchange with path memory length $\Lambda$, shown in FIG. 8 according to an embodiment of the invention. Each register has an input bit associated with time k-$\lambda$-4. The two registers store the survivor paths leading to states $\sigma^0_k$ and $\sigma^1_k$. Since $\sigma_{0k}$ is always equal to the state at time k-$\lambda$ on the best path, denoted by $S^{Ak}_{k-\lambda}$, the register associated with this state, referred to as register(0), always contains the backend of the best survivor path.

As a consequence, the final decision from the path memory comes from the output of register(0).

The other register, referred to as register(1), contains the backend of an alternative survivor path. The alternative path the survivor path is for the state at time k with the same ISI state as the best state and the opposite parity state, $B_k=A_k\oplus 16$.

That is unless $S^{Bk}_{k-\lambda}=S^{Ak}_{k-\lambda}$, in which case it is an extension of an old alternative path. The connection bit for each new state indicates which of the old states is connected to the new state. The new state $\sigma^0_k$ is connected to the old state $\sigma^{\text{connect0}k}_{k-1}$ and the new state $\sigma^1_k$ is connected to the old state $\sigma^{\text{connect1}k}_{k-1}$.

Register(0) is updated by shifting in the old survivor path stored in register(connect$0_k$) and inputting the most significant ISI bit in state $\sigma^{\text{connect0}k}_{k-1}$. The input to register(0) is the decision bit at time k-$\lambda$-4 along the survivor path leading to the best state $A_k$, $$\text{input0}_k=(msb \text{ of } ISI \text{ state } \sigma^{\text{connect0}k}_{k-1})=(s^{\text{connect0}k}_{k-1}>>3)\&1=x^{Ak}_{k-\lambda-4}.$$

Similarly, register(1) is updated by shifting in the old survivor path stored in register(connect$1_k$) and inputting the most significant ISI bit in the state designated $\sigma^{\text{connect1}k}_{k-1}$.

At time k, there are two new states $\sigma^0_k$ and $\sigma^1_k$ to be connected up with the two old states $\sigma^0_{k-1}$ and $\sigma^1_{k-1}$.

Figure 9:
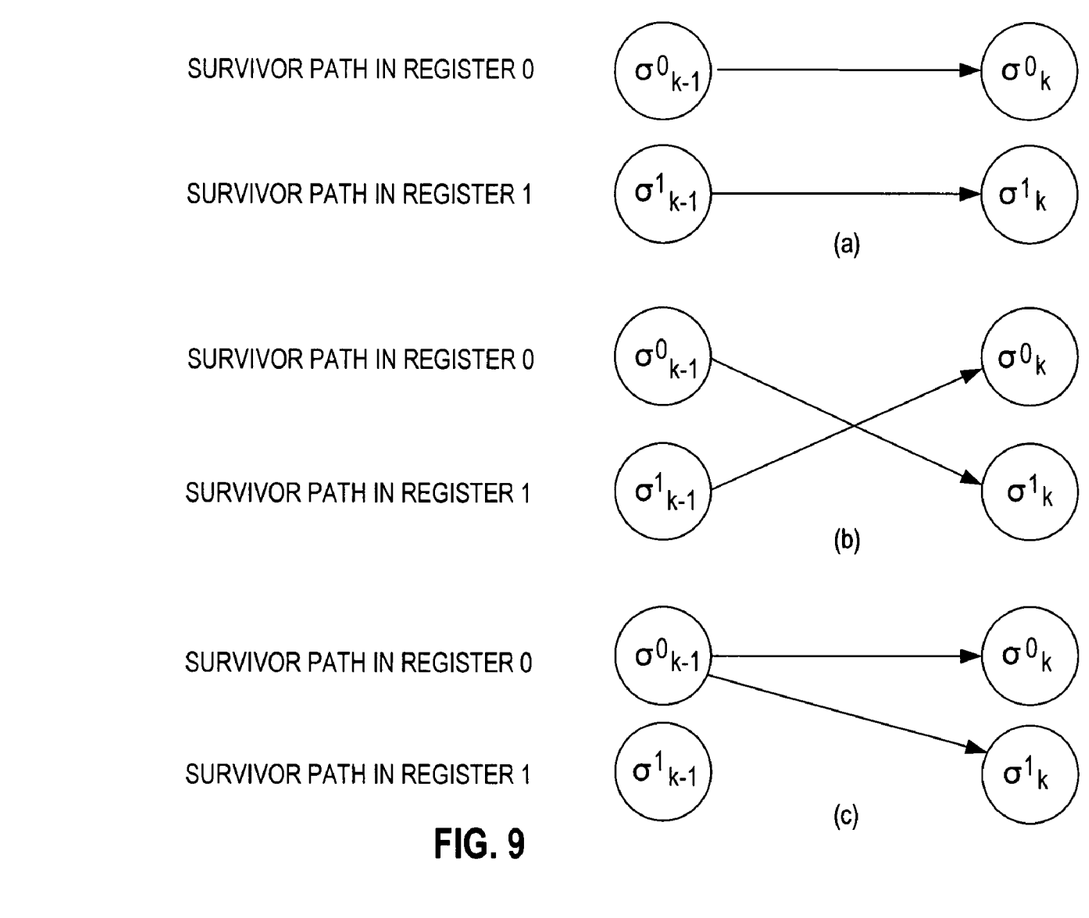
FIG. 9 shows three possible connections between the old states and the new states, by referring to a) an extended error-event maintaining the ranking of the two survivor paths, b) an extended error-event with ranking switch, and c) a new error-event being started according to an embodiment of the invention.

FIG. 9 shows the three possible types of connections according to an embodiment of the invention.

In FIG. 9(a), the error-event stored in the two registers is extended with the new best path connected to the old best path.

In FIG. 9($b$), the error-event stored in the two registers is extended with the best path connected to the old alternative path.

In FIG. 9($c$), the registers store a new error-event.

The following is an algorithm for determining the connection bit for the new state $\sigma_k[Q,e,f,g,h]$, given the old states $\sigma^0_{k-1}=[P^0,a^0,b^0,c^0,d^0]$ and $\sigma^1_{k-1}=[P^1,a^1,b^1,c^1,d^1]$.

The shortest connection is selected, with the state on the old best path, $\sigma^0_{k-1}$, taking preference when there is a tie.

Define a routine that returns the connect bit such that
connect$0_k$=connection($\sigma^0_{k-1}$, $\sigma^1_{k-1}$, $S^{Ak}_{k-\lambda}$)
where $\sigma^0_k = S^{Ak}_{k-\lambda}$ always and the routine connection([$P^0$, $a^0,b^0,c^0,d^0$], [$P^1,a^1,b^1,c^1,d^1$], [Q,e,f,g,h]) is given by
if ([Q,e,f,g]==[$P^1 \oplus h, b^1,c^1,d^1$]),
then there is a one-step connection to $\sigma^1_{k-1}$
num_steps=1
else if ([Q,e,f]==[$P^1 \oplus h \oplus 1, b^1, c^1$]), $d^1 \neq g$
then there is a two-step connection to $\sigma^1_{k-1}$
num_steps=2
else if ([Q,e]==[$P^1 \oplus h \oplus g \oplus d^1 \oplus 1, b^1$]), $c^1 \neq f$
then there is a three-step connection to $\sigma^1_{k-1}$
num_steps=3
else if (Q==$P^1 \oplus h \oplus g \oplus f \oplus d^1 \oplus c^1 \oplus 1$), $b^1 \neq e$
then there is a four-step connection to $\sigma^1_{k-1}$
num_steps=4.
if ([Q,e,f,g]==[$P^0 \oplus h, b^0,c^0,d^0$]),
then there is a one-step connection to $\sigma^0_{k-1}$
connect=0
else if ([Q,e,f]==[$P^0 \oplus 1, b^0,c^0$]), $d^0 \neq g$
then there is a two-step connection to $\sigma^0_{k-1}$
connect=(num_steps==1) ? 1:0
else if ([Q,e]==[$P^0 \oplus g \oplus h \oplus d^0 \oplus 1 b^0$]), $c^0 \neq f$
then there is a three-step connection to $\sigma^0_{k-1}$
connect=(num_steps<=2) ? 1:0
else if (Q==$P^0 \oplus f \oplus g \oplus h \oplus c^0 \oplus d^0 \oplus 1$), $b^0 \neq e$
then there is a four-step connection to $\sigma^0_{k-1}$
connect=(num_steps<=3) ? 1:0
else
there is always a five-step connection to $\sigma^0_{k-1}$
connect=(num_steps<=4) ? 1:0.
return(connect)

If $S^{Bk}_{k-\lambda}$ is not equal to $S^{Ak}_{k-\lambda}$, then set $\sigma^1_{k-\lambda} = S^B_{k-\lambda}$.

If $S^{Bk}_{k-\lambda}$ is equal to $S^{Ak}_{k-\lambda}$, and we are out of the pruning region, then we extend the old state that is not connected to the best path, denoted by $\sigma^{connect0k \oplus 1}_{k-1}$.

Define prune_region as the region where the states will be overridden (for PR targets with 5 taps, this happens at 5 time instances every codeword).

The extended state is derived from ($\sigma^{connect0k \oplus 1}_{k-1}$) as follows:

1. Let state ($\sigma^{connect0k \oplus 1}_{k-1}$) be [p a b c d] where p is the parity of that state and [a b c d] is the ISI of that state.
2. Define newbit=LSB of $\sigma^0_k$.
3. Extended state=[p$\oplus$newbit, b c d, newbit].

Then, the new state associated with register(1) is given by $\sigma^1_k = (S^B_{k-\lambda} == S^A_{k-\lambda})$ ? extendstate$_k$: $S^B_{k-\lambda}$.

Next, we use the connection routine to determine which of the old states is connected to $\sigma^1_k$, connect$1_k$=connection($\sigma^0_{k-1}$, $\sigma^1_{k-1}$, $\sigma^1_k$).

The input to register(1) is the most significant ISI bit in the old state that is connected to $\sigma^1_k$, input$1_k = (\sigma^{connect1k}_{k-1} >> 3) \& 1$.

Note that pruning is done at time k (i.e. at the front end of Viterbi trellis) in the same way as with the full complexity Viterbi algorithm.

After the sixth (and final) stage of the pruning, all survivor paths pass through the even-parity states at the time corresponding to the first pruning stage (which corresponds to the end of codeword), so all survivor paths are valid.

During the first five stages of pruning, $B_k$ will not be a valid state, but this will not affect the algorithm because only states that are valid at the end of the first stage will be passed to the second stage.

On the half-rate implementation, two ITR samples are input at a time, and two bits are output at a time. Since the front end of the Viterbi algorithm operates at half rate, the ACS is modified so that two branch metrics are added to a state metric to produce a path metric, and a 6-way comparison is used to compare among four path metrics.

Regarding the reduced complexity implementation, the part of the algorithm performed at time k (i.e. at the front end of the Viterbi) is done every two bits. The part of the reduced complexity algorithm done at the boundary between the first and the second stage is also done every two bits, and the connect algorithm looks for two-step connections, four-step connections, and six-step connections (there will always be a six-step connection).

Figure 10:
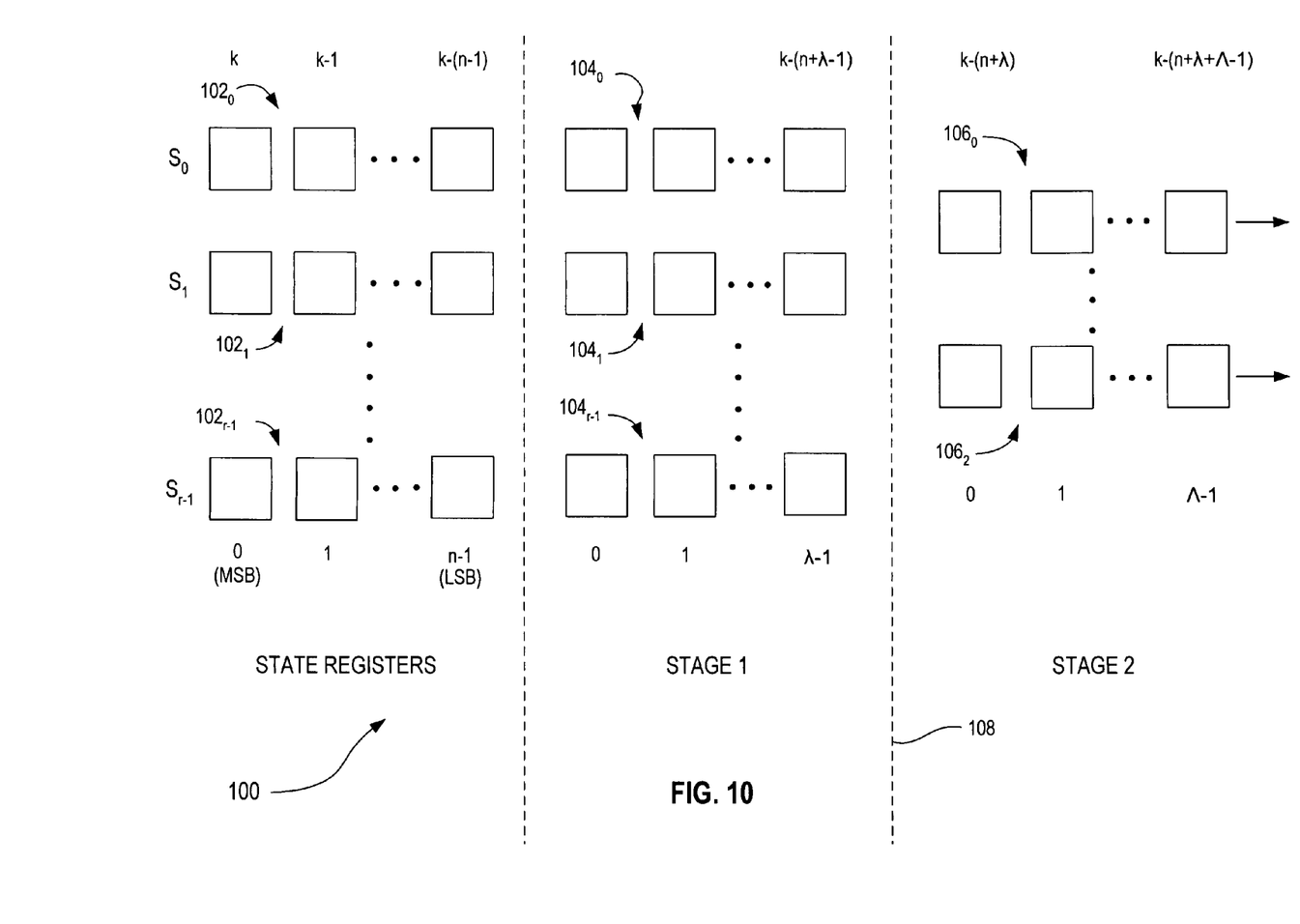
FIG. 10 is a block diagram of a path-history-register section of a parity-sensitive Viterbi detector that operates in a manner similar to that described above in conjunction with FIGS. 3-9 according to an embodiment of the invention.

FIG. 10 is a block diagram of a path-history-register section 100 of a parity-sensitive Viterbi detector (shown in FIG. 11) that operates in a manner similar to that described above in conjunction with FIGS. 3-9 according to an embodiment of the invention.

The Viterbi detector tracks r possible states $S_0$-$S_{r-1}$ of a received bit stream, and recovers the code words that compose the bit stream, each of the code words including at least one parity bit. For example, as discussed above in conjunction with FIGS. 3-9, the Viterbi detector may track r=32 possible states $S_0$-$S_{31}$, where sixteen of these possible states have even parity, and the other sixteen possible states (which are the same as the first sixteen states but for different parity) have odd parity.

The path-history section 100 includes r state registers $102_0$-$102_{r-1}$, one for each possible state $S_0$-$S_{r-1}$. Each state register 102 has n=log$_2$r locations 0–n–1 that store the bit values for corresponding state—the most-significant-bit (MSB) location(s) 0 of each register 102 stores the parity bit(s). For example, where r=32, n=5, $S_0$=00000, $S_1$=00001, and $S_{31}$=11111, the register $102_0$ stores 00000 (MSB=0 for even parity), the register $102_1$ stores 00001 (MSB=0 for even parity), and the register $102_{31}$ stores 11111 (MSB=1 for odd parity).

Figure 11:
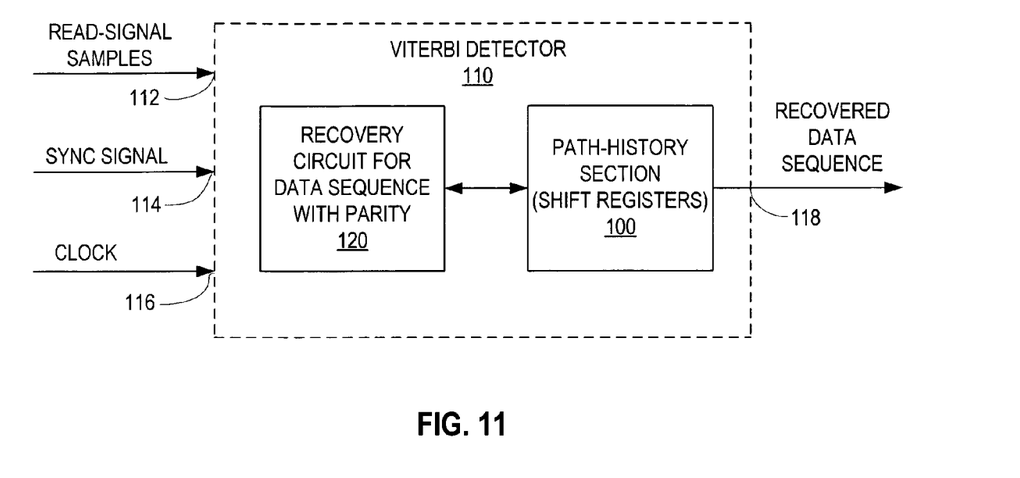
FIG. 11 is a block diagram of a Viterbi detector that includes the path-history-register section of FIG. 10 according to an embodiment of the invention.

In addition, the path-history section 100 includes r stage-1 registers $104_0$-$104_{r-1}$, one for each possible state $S_0$-$S_{r-1}$. Each stage-1 register 104 has λ locations 0-λ–1 that store the surviving bit path for the corresponding state from sample time k-(n+λ–1) to the most recent sample time k-n. The value of λ depends on the ISI latency of the Viterbi algorithm implemented by the Viterbi detector (FIG. 11). The ISI latency is the path length required for all of the stage-1 registers $104_0$-$104_{r-1}$ to effectively converge to a single surviving path relative to ISI. But because the surviving paths stored in the stage-1 registers $104_0$-$104_{r-1}$ may have different and/or incorrect parities, the bit values stored in one stage-1 register may be, and often are, different than the bit values stored in another stage-1 register. For example, λ=28 for the Viterbi algorithm discussed above in conjunction with FIGS. 3-9.

Furthermore, the path-history section 100 includes z stage-2 registers $106_0$-$106_{z-1}$, one for each possible parity state. For example, because the Viterbi algorithm discussed above in conjunction with FIGS. 3-9 uses one parity bit per code word, there are two possible parity states even and odd, and thus z=2. Each stage-2 register 106 has $\Lambda$ locations $0$-$\Lambda$-$1$ that store the surviving bit path for the corresponding parity state from sample time k-(n+$\lambda\Lambda$-1) to sample time k-(n+$\lambda$). The value of $\Lambda$ depends on the parity latency of the Viterbi algorithm implemented by the Viterbi detector (FIG. 11). The parity latency is the path length required for at least one of the stage-2 registers $106_0$-$106_{\Lambda-1}$ to converge to a surviving path relative to both ISI and parity—the rightmost multiplexer of FIG. 8 selects the stage-2 register 106 that has converged to the surviving path, and the current bit of the recovered bit stream is shifted out of this selected register. For example, $\Lambda$=69 for the Viterbi algorithm discussed above in conjunction with FIGS. 3-9.

The path-history section 100 often contains fewer bit locations than the path-history section of conventional parity-sensitive Viterbi detectors. For example, for the same bit-stream coding scheme, the path-history section of a conventional thirty-two-state parity-sensitive Viterbi detector would include r(n+$\lambda$+$\Lambda$)=3264 bit locations, whereas the path-history section 100 includes approximately one-third fewer bit locations, i.e., r(n+$\lambda$)+z$\Lambda$=1194 bit locations. This savings of memory in the path-history section often reduces the cost and complexity of the Viterbi detector.

Still referring to FIG. 10, the operation of the Viterbi detector (FIG. 11) relative to the path-history section 100 is discussed according to an embodiment of the invention.

Data is shifted into the stage-1 registers 104 from the respective registers 102 via the left side of the stage-1 registers in a manner similar to that of a conventional Viterbi algorithm.

At an interface 108 between the stage-1 registers 104 and the stage-2 registers 106, the stage-interface algorithm discussed above in conjunction with FIGS. 3-9 causes the Viterbi detector to shift the appropriate data from one or more of the stage-1 registers 104 into the stage-2 registers 106.

The recovered bit stream is then shifted out of the registers 106 (via the rightmost multiplexer of FIG. 8) for decoding by other circuitry (not shown in FIG. 10).

FIG. 11 is a block diagram of a Viterbi detector 110, which includes the path-history section 100 of FIG. 10 according to an embodiment of the invention.

The Viterbi detector 110 includes a terminal 112 for receiving the synchronized samples of a read signal (i.e., a bit stream), a terminal 114 for receiving a synchronization signal, a terminal 116 for receiving a clock signal, and a terminal 118 for providing the recovered data sequence. In one embodiment, the sync and clock signals are binary logic signals, and the data sequence is binary. As discussed below, the sync signal identifies the beginning of the data sequence, and the detector 110 uses the clock signal—which in one embodiment is the same as or is derived from the read-signal sample clock—to provide timing to the detector 110. The detector 110 also includes a recovery circuit 120 that executes the Viterbi algorithm discussed above in conjunction with FIGS. 3-9. Specifically, the recovery circuit 120 processes the read-signal samples to extract from the data sequence code words having a recognized parity. As discussed above in conjunction with FIG. 10, the recovery circuit 120 causes the registers in the path-history section 100 to store the surviving paths of the data sequence until the paths converge to the recovered data sequence.

In operation, the synchronization signal transitions from one logic state to the other to indicate that the next read sample represents the first bit of the data sequence. A circuit for generating the sync signal is disclosed in U.S. Pat. No. 6,604,204, which is incorporated by reference. In response to this transition of the sync signal, the recovery circuit 120 process the next and subsequent read samples according to a trellis diagram that accounts for the parity of the data sequence. Examples of such trellis diagrams are discussed below in previously incorporated U.S. Pat. No. 6,662,338. The circuit 120 uses these samples to calculate and update the surviving-path metrics, and stores the surviving paths in the shift registers of the path-history section 100 as discussed above in conjunction with FIG. 10. One of the stage-2 shift registers 106 shifts out the recovered data sequence onto the terminal 118 as discussed above in conjunction with FIG. 10.

Figure 12:
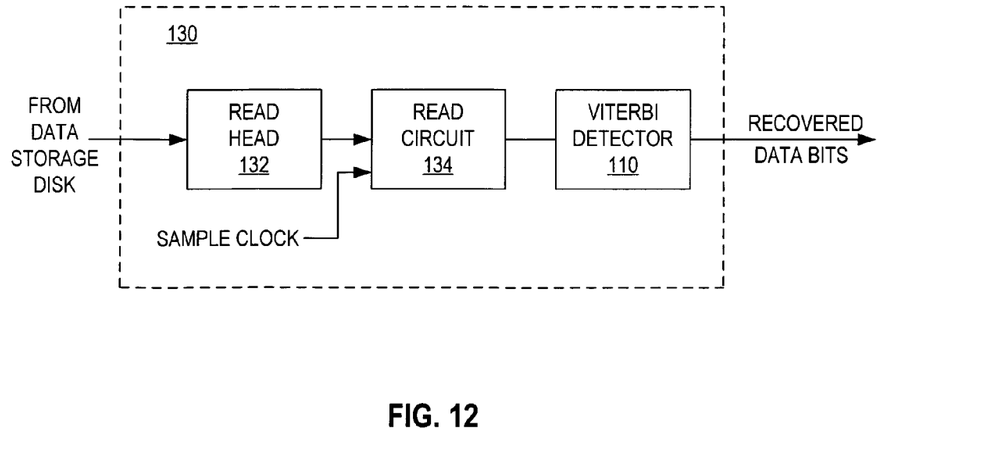
FIG. 12 is a block diagram of a read channel that incorporates the Viterbi detector of FIG. 11 according to an embodiment of the invention.

FIG. 12 is a circuit block diagram of a read channel 130, which reads data from a magnetic or other type of data-storage disk (not shown in FIG. 12) and which incorporates the Viterbi detector 110 of FIG. 11 according to an embodiment of the invention. In addition to the Viterbi detector 110, the read channel 130 includes a read head 132 for sensing the data stored on the disk and for generating a corresponding read signal. A read circuit 134 amplifies and samples the read signal and digitizes the samples, and the Viterbi detector 110 recovers the stored data from the digitized samples as discussed above in conjunction with FIGS. 10-11.

Figure 13:
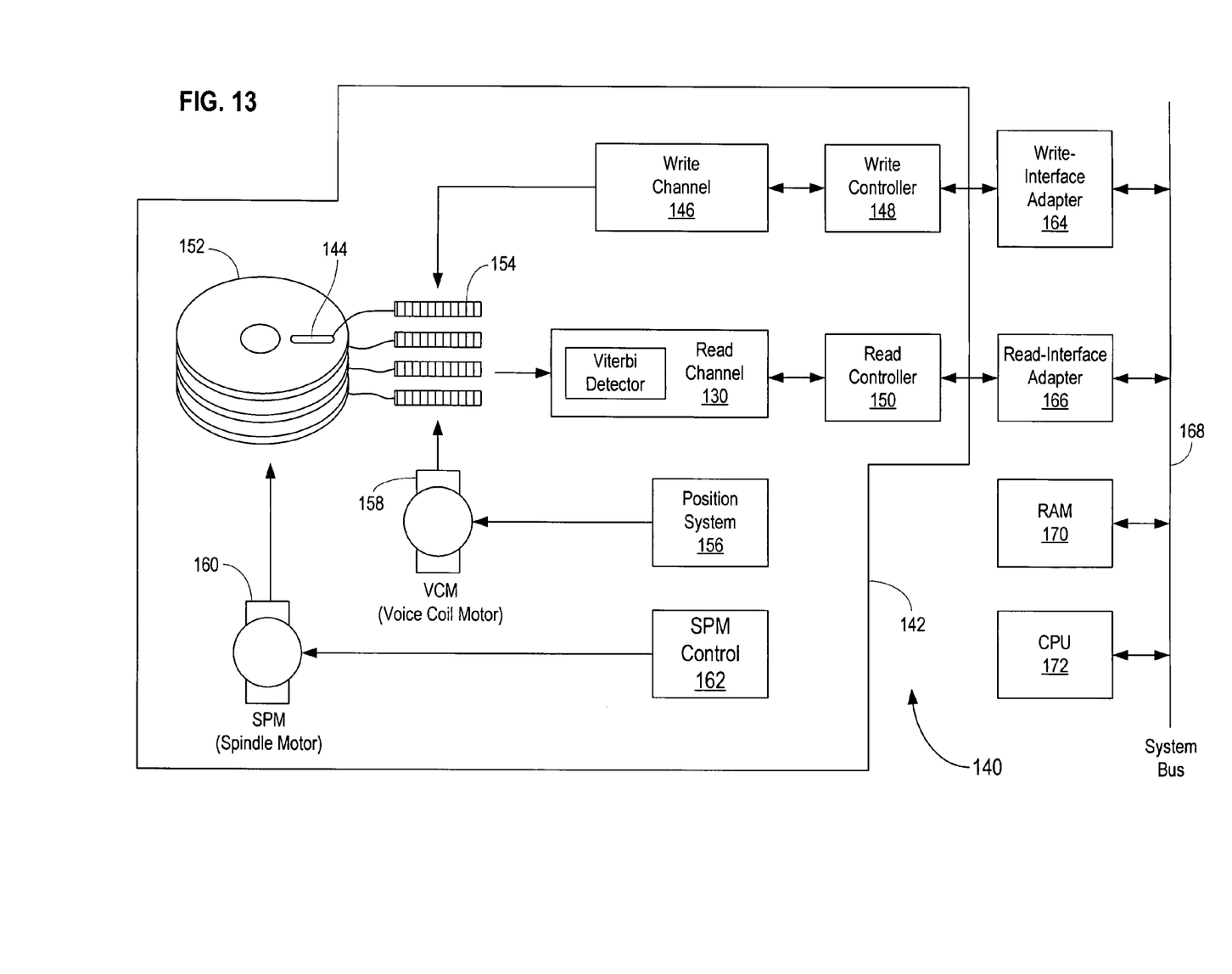
FIG. 13 is a block diagram of a disk-drive system that incorporates the read channel of FIG. 12 according to an embodiment of the invention.

FIG. 13 is a block diagram of a disk-drive system 140, which incorporates the read channel 130 of FIG. 12 according to an embodiment of the invention. Specifically, the disk-drive system 140 includes a disk drive 142, which incorporates the read channel 130 of FIG. 12, and thus incorporates the Viterbi detector 110 of FIG. 11. The disk drive 142 includes a combination write/read head 144, a write channel 146 for generating and driving the head 144 with a write signal, and a write controller 148 for interfacing the write data to the write channel 146. In one embodiment, the write channel 146 includes the data encoder disclosed in U.S. Pat. No. 6,492,918, which is incorporated by reference. The disk drive 142 also includes the read channel 130 for receiving a read signal from the head 144 and for recovering the written data from the read signal, and includes a read controller 150 for organizing the read data. The disk drive 142 further includes a storage medium such as one or more disks 152, each of which may contain data on one or both sides. The write/read head 144 writes/reads the data stored on the disks 152 and is connected to a movable support arm 154. A position system 156 provides a control signal to a voice-coil motor (VCM) 158, which positionally maintains/moves the arm 154 so as to positionally maintain/radially move the head 144 over the desired data on the disks 152. A spindle motor (SPM) 160 and a SPM control circuit 162 respectively rotate the disks 152 and maintain them at the proper rotational speed.

The disk-drive system 140 also includes write and read interface adapters 164 and 166 for respectively interfacing the write and read controllers 148 and 150 to a system bus 168, which is specific to the system used. Typical system busses include ISA, PCI, S-Bus, Nu-Bus, etc. The system 140 also typically has other devices, such as a random access memory (RAM) 170 and a central processing unit (CPU) 172 coupled to the bus 168.

From the foregoing it will be appreciated that, although specific embodiments of the invention have been described herein for purposes of illustration, various modifications may be made without deviating from the spirit and scope of the invention.

For example, although the Viterbi algorithm discussed above in conjunction with FIGS. 3-9 is constructed to recover code words having a single parity bit, one may alter the algorithm to recover code words having more than one parity bit. For example, one may design the algorithm to recover code words each having two parity bits, one for the even interleave (i.e., the even bit positions) of the word and the other for the odd interleave (i.e., the odd bit positions) of the word.

Referring to FIG. 10, generally, for each parity bit added to the code words, the number of states S doubles, the number of stage registers 102 doubles, the number of stage-1 registers 104 doubles, and the number of stage-2 registers 106 doubles. For example, for code words having two parity bits instead of one parity bit, the path-history section 100 would include sixty four registers 102, sixty four registers 104, and four registers 106.

Furthermore, although a disk drive system 140 of FIG. 13 is disclosed as incorporating the Viterbi detector 110 of FIG. 11, other types of communication systems, such as cell-phone systems, may incorporate the Viterbi detector 110.

What is claimed is:

1. A method for detecting signals affected by intersymbol interference (ISI), the method including the steps of:
   providing a path memory in the form of a trellis admitting survivor paths comprising a first and a second stage, said first stage including a shift register exchange with a given number of states and a given length $\lambda$,
   outputting from said first stage at time k-$\lambda$, where $\lambda$ is said given length:
   a) a first state $S^{Ak}_{k-\lambda}$ on the survivor path for a best state $A_k$ at time k, while keeping track of a parity for the best state at time k-$\lambda$ for each of the survivor paths in said path memory, and
   b) a second state $S^{Bk}_{k-\lambda}$ on the survivor path for another state $B_k$ having a same ISI state as said best state $A_k$ and an opposite parity state,
   configuring said second stage as a two-state shift register exchange having a respective memory length $\Lambda$, including respective first and second registers,
   storing in said respective first and second registers the survivor paths leading to respective first $\sigma^0_k$ and second $\sigma^1_k$ states, said respective first state being equal to said first state $S^{Ak}_{k-\lambda}$ on said best survivor path, whereby said respective first register contains the backend of said best survivor path, while said respective second register contains the backend of an alternative survivor path, said alternative survivor path being for an alternative state at time k with the same ISI state as said best state and the opposite parity state.

2. The method of claim 1, further comprising the step of taking a final decision from said path memory from the output of said first register.

3. The method of claim 1, further comprising the step of defining said alternative path whose backend is contained in said respective second register as an extension of a previous alternative path when said second state $S^{Bk}_{k-\lambda}$ is equal to said first state $S^{Ak}_{k-\lambda}$ and we are outside of a pruning region.

4. The method of claim 1, further comprising the step of updating said respective first $\sigma^0_k$ and second ($\sigma^1_k$) states by generating respective new states via at least one respective connection bit indicating for each new state which of the old states is connected to the new state.

5. The method of claim 4, further comprising the step of connecting a new state for said respective first state $\sigma^0_k$ to a respective first old state $\sigma^{connect0k}_{k-1}$ while connecting a new state for said respective second state $\sigma^1_k$ to a respective second old state $\sigma^{connect1k}_{k-1}$.

6. The method of claim 4, further comprising determining a connection bit for a new state $\sigma_k$=[Q,e,f,g,h], given the old states $\sigma^0_{k-1}$ =[$P^0$,$a^0$,$b^0$, $c^0$,$d^0$] and $\sigma^1_{k-1}$ =[$P^1$,$a^1$,$b^1$,$c^1$,$d^1$] by selecting a shortest connection, with the state on the old best path, $\sigma^0_{k-1}$, taking preference when there is a tie, wherein selecting the connection bit comprises:
   setting connect0$_k$=connection($\sigma^0_{k-1}$, $\sigma^1_{k-1}$, $S^{Ak}_{k-\lambda}$),
   where $\sigma^0_k$=$S^{Ak}_{k-\lambda}$ always and the routine connection([$P^0$, $a^0$,$b^0$,$c^0$,$d^0$], [$P^1$,$a^1$,$b^1$,$c^1$,$d^1$], [Q,e,f,g,h]) is given by,
   if ([Q,e,f,g]==[$P^1 \oplus h$, $b^1$, $c^1$, $d^1$]),
   then there is a one-step connection to $\sigma^1_{k-1}$
   num_steps=1
   else if ([Q,e,f]==[$P^1 \oplus h \oplus 1$,$b^1$,$c^1$]), $d^1 \neq g$
   then there is a two-step connection to $\sigma^1_{k-1}$
   num_steps=2
   else if ([Q,e]==[$P^1 \oplus h \oplus g \oplus d^1 \oplus 1$,$b^1$]), $c^1 \neq f$
   then there is a three-step connection to $\sigma^1_{k-1}$
   num_steps=3
   else if (Q==$P^1 \oplus h \oplus g \oplus f \oplus d^1 \oplus c^1 \oplus 1$), $b^1 \neq e$
   then there is a four-step connection to $\sigma^1_{k-1}$
   num_steps=4.
   if ([Q,e,f,g]==[$P^0 \oplus h$, $b^0$,$c^0$,$d^0$]),
   then there is a one-step connection to $\sigma^0_{k-1}$
   connect=0
   else if ([Q,e,f]==[$P^0 \oplus h \oplus 1$, $b^0$,$c^0$]), $d^0 \neq g$
   then there is a two-step connection to $\sigma^0_{k-1}$
   connect=(num_steps==1) ? 1:0
   else if ([Q,e]==[$P^0 \oplus g \oplus h \oplus d^0 \oplus 1$,$b^0$]), $c^0 \neq f$
   then there is a three-step connection to $\sigma^0_{k-1}$
   connect=(num_steps<=2) ? 1:0
   else if (Q==$P^0 \oplus f \oplus g \oplus h \oplus c^0 \oplus d^0 \oplus 1$), $b^0 \neq e$
   then there is a four-step connection to $\sigma^0_{k-1}$
   connect=(num_steps<=3) ? 1:0
   else there is always a five-step connection to $\sigma^0_{k-1}$
   connect=(num_steps<=4) ? 1:0,
   return(connect),
   if $S^{Bk}_{k-\lambda}$ is not equal to $S^{Ak}_{k-\lambda}$, then set $\sigma^1_{k-\lambda}$=$S^B_{k-\lambda}$,
   and if $S^{Bk}_{k-\lambda}$ is equal to $S^{Ak}_{k-\lambda}$ and the current sample time is out of a pruning region, then extending the old state that is not connected to the best path, denoted by $\sigma^{connect0k \oplus 1}_{k-1}$,
   wherein the pruning region comprises a region where states will be overridden.

7. The method of claim 5, further comprising the steps of updating said respective first register by shifting in an old survivor path stored in a respective register-(connect0$_k$) and inputting a most significant ISI bit in said respective first old state $\sigma^{connect0k}_{k-1}$.

8. The method of claim 5, further comprising the steps of updating said respective second register by shifting in an old survivor path stored in a respective register-(connect1$_k$) and inputting a most significant ISI bit in said respective second old state $\sigma^{connect1k}_{k-1}$.

9. The method of claim 1, further comprising the steps of initializing the parity states for said first and second states in the vicinity of the beginning of the sector.

10. The method of claim 9, further comprising the step of initializing a parity bit at the end of the register to represent the parity state of the register itself.

11. The method of claim 9, further comprising the step of initializing said survivor paths to all zeros at the beginning of the sector at an arbitrary time relative to the data while the parity of the state at time k-$\lambda$ at the end of the survivor path leading to stage j at time k is initialized to the modulo 2 sum of a given number of bits in the state number.

12. The method of claim 1, wherein said given number of states is 32.

13. A system for detecting signals affected by intersymbol interference (ISI), the system including:
   a path memory in the form of a trellis admitting survivor paths comprising a first and a second stage, said first stage including a shift register exchange with a given number of states and a given length λ, said first stage being configured to output at time k-λ, where λ is said given length:
a) a first state $S^{Ak}_{k-\lambda}$ on the survivor path for a best state $A_k$ at time k, while keeping track of a parity for the best state at time k-λ for each of the survivor paths in said path memory, and
b) a second state $S^{Bk}_{k-\lambda}$ on the survivor path for another state $B_k$ having a same (ISI) state as said best state $A_k$ and an opposite parity state,
said second stage comprising a two-state shift register exchange having a respective memory length Λ, including respective first and second registers, said respective first and second registers configured to store the survivor paths leading to a respective first $\sigma^0_k$ and second $\sigma^1_k$ states, said respective first state being equal to said first state $S^{Ak}_{k-\lambda}$ on said best survivor path, whereby said respective first register contains the backend of said best survivor path, while said respective second register contains the backend of an alternative survivor path, said alternative survivor path being for an alternative state at time k with the same ISI state as said best state and the opposite parity state.

14. The system of claim 13 wherein the system is configured to take a final decision from said path memory from the output of said first register.

15. The system of claim 13 wherein said alternative path whose backend is contained in said respective second register is an extension of a previous alternative path when said second state $S^{Bk}_{k-\lambda}$ is equal to said first state $S^{Ak}_{k-\lambda}$.

16. The system of claim 13, wherein said respective first $\sigma^0_k$ and second $\sigma^1_k$ states are configured to be updated by generating respective new states via at least one respective connection bit indicating for each new state which of the old states is connected to the new state.

17. The system of claim 16, further comprising at least one connection for connecting a new state for said respective first state $\sigma^0_k$ to a respective first old state $\sigma^{connect0k}_{k-1}$ while connecting a new state for said respective second state $\sigma^1_k$ to a respective second old state $\sigma^{connect1k}_{k-1}$.

18. The system of claim 17, further comprising a shift arrangement for updating said respective first register by shifting in an old survivor path stored in a respective register-(connect0$_k$) and inputting a most significant ISI bit in said respective first old state $\sigma^{connect0k}_{k-1}$.

19. The system of claim 18 wherein said shift arrangement is arranged to update said respective second register by shifting in an old survivor path stored in a respective register-(connect1$_k$) and inputting a most significant ISI bit in said respective second old state $\sigma^{connect1k}_{k-1}$.

20. The system of claim 13, further comprising a detector block for detecting, on the basis of said first $S^{Ak}_{k-\lambda}$ and second $S^{Bk}_{k-\lambda}$ states, the occurrence of first, second and third conditions, said first, second and third conditions corresponding to:
an odd parity error-event in said second stage of the path memory,
an odd parity error-event in said first stage of the path memory having a smaller Euclidean distance than the odd parity error-event starting in said second stage, the error-event in said second stage being extended as adapted to re-emerge as a dominant error-event in the future, and
a new error-event in said second stage of the path memory becoming dominant and replacing an old error-event, respectively.

21. The system of claim 20 wherein in said first condition the survivor paths for said first $A_k$ and second $B_k$ states are parallel paths with opposite parity states and the same ISI states from time k-λ to time k.

22. The system of claim 17 wherein the path memory length of said first stage is long enough to prevent an error-event starting in said second stage from overlapping from an error-event ending in the future.

23. The system of claim 17 wherein said new states for said respective first $\sigma^0_k$ and second $\sigma^1_k$ states are connected with the respective old first $\sigma^0_{k-1}$ and second $\sigma^1_{k-1}$ states by resorting to one of three possible types of connections, namely:
an error-event stored in said respective first and second registers is extended with the new best path connected to the old best path,
an error-event stored in said respective first and second registers is extended with the best path connected to the old alternative path, and
said respective first and second registers store a new error-event.

24. The system of claim 13 wherein the system is configured to initialize the parity states for said first and second states in the vicinity of the beginning of the sector.

25. The system of claim 24 wherein the system is configured to initialize a parity bit at the end of the register to represent the parity state of the register itself.

26. The system of claim 24, further comprising said survivor paths all initialized to all zeros at the beginning of the sector at an arbitrary time relative to the data while the parity of the state at time k-λ at the end of the survivor path leading to stage j at time k is initialized to the modulo 2 sum of a given number of bits in the state number.

27. The system of claim 13 wherein said given number of states is 32.

28. A computer program product, directly loadable in the internal memory of a digital computer and comprising software code portions adapted to implement the method of claim 1 when said product is run on a digital computer.

29. A Viterbi detector, comprising:
a first stage including a first number of path-history registers each having a first length; and
a second stage coupled to the first stage and including a second number of path-history registers each having a second length, the second number being different than the first number.

30. The Viterbi detector of claim 29 wherein the first length is different from the second length.

31. A method, comprising:
shifting a first value into a first path-history register of a first stage including a first number of path-history registers each having a first length; and
shifting a second value from a path-history register in the first stage into a second path-history register of a second stage including a second number of path-history registers each having a second length, the second number being different than the first number.

32. The Viterbi detector of claim 31 wherein the first length is different from the second length.

33. A read channel, comprising:
a Viterbi detector including,
a first stage including a first number of path-history registers each having a first length, and
a second stage coupled to the first stage and including a second number of path-history registers each having a second length, the second number being different than the first number.

34. An electronic system, comprising:
a read channel including,
a Viterbi detector having, a first stage including a first number of path-history registers each having a first length, and a second stage coupled to the first stage and including a second number of path-history registers each having a second length, the second number being different than the first number.

* * * * *